(12) United States Patent
Robertson, Jr. et al.

(10) Patent No.: US 9,822,665 B2
(45) Date of Patent: Nov. 21, 2017

(54) CORE DRAINAGE SYSTEMS FOR FAN CASE ASSEMBLIES

(71) Applicant: UNITED TECHNOLOGIES CORPORATION, Farmington, CT (US)

(72) Inventors: Thomas J. Robertson, Jr., Glastonbury, CT (US); Steven Clarkson, Cheshire, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 358 days.

(21) Appl. No.: 14/560,334

(22) Filed: Dec. 4, 2014

(65) Prior Publication Data
US 2015/0159508 A1    Jun. 11, 2015

Related U.S. Application Data

(60) Provisional application No. 61/912,218, filed on Dec. 5, 2013.

(51) Int. Cl.
| | |
|---|---|
| F01D 25/00 | (2006.01) |
| F01D 25/24 | (2006.01) |
| F01D 25/32 | (2006.01) |
| F01D 21/04 | (2006.01) |

(52) U.S. Cl.
CPC ............. *F01D 25/24* (2013.01); *F01D 25/32* (2013.01); *F01D 21/045* (2013.01); *F05D 2260/602* (2013.01); *Y02T 50/671* (2013.01)

(58) Field of Classification Search
CPC .......... F01D 25/24; F01D 25/32; F01D 25/14; F01D 11/127; F05D 2260/602; F04D 29/40; F04D 29/403; F04D 29/52; F04D 29/522
USPC ...................................................... 415/169.2
See application file for complete search history.

(56) References Cited

U.S. PATENT DOCUMENTS

| | | | | |
|---|---|---|---|---|
| 8,613,591 | B2 * | 12/2013 | Barnett | F01D 25/32 |
| | | | | 415/169.2 |
| 8,636,464 | B2 * | 1/2014 | Bottome | F01D 11/08 |
| | | | | 415/196 |
| 8,640,986 | B2 * | 2/2014 | Surply | B64D 33/02 |
| | | | | 244/204 |
| 8,733,500 | B1 * | 5/2014 | Ayle | G10K 11/172 |
| | | | | 181/284 |

* cited by examiner

*Primary Examiner* — Gregory Anderson
*Assistant Examiner* — Julian Getachew
(74) *Attorney, Agent, or Firm* — Cantor Colburn LLP

(57) ABSTRACT

A core for a fan containment includes an intermediate core segment and a plenum for fluid passage defined through the intermediate core segment. The intermediate core segment has an axial inlet side, an axial outlet side opposed to the axial inlet side, a radially inner side, and a radially outer side opposed to the radially inner side. The radially outer side is configured to be operatively connected to a cylindrical outer case and the radially inner side is configured to be operatively connected to at least one arcuate panel to form a liner assembly. The plenum extends through the intermediate core segment proximate the radially outer side for fluid passage between the axial inlet side and the axial outlet side.

17 Claims, 3 Drawing Sheets

CORE DRAINAGE SYSTEMS FOR FAN CASE ASSEMBLIES

CROSS-REFERENCE TO RELATED APPLICATIONS

This application claims benefit of priority to U.S. Provisional Application No. 61/912,218 filed Dec. 5, 2013, which is incorporated by reference herein in its entirety.

BACKGROUND OF THE INVENTION

1. Field of the Invention

The present disclosure relates to fan case assembly drainage, and more particularly to fan case assembly drainage in a turbofan engine.

2. Description of Related Art

Traditionally, a turbo fan engine for an aircraft has a turbine that drives fan blades to draw air into the engine as the turbine rotates. The fan blades are contained by a stationary fan containment case assembly that includes an outer case and a series of radially inward facing liners. Fan containment case assemblies are generally designed to drain water that enters the liner system through acoustic holes out of the fan case. Drain holes are generally located on the forward and aft sides of the containment portion of the case. Traditional drainage designs include drainage tubes routed under the ice liner core of the containment portion of the case to transport water out of the containment portion of the case in order to drain from a less critical structural region. Drainage tubes can be expensive and difficult to bond in the correct location.

The containment portion of the case is generally more structurally critical due to various requirements by the Federal Aviation Administration and other regulatory agencies, such as the requirement that any fan blade that fails must be contained within the engine casing. This requirement generally requires that the containment portion be designed to resist the impact of a fan blade in the event that a fan blade, or a portion thereof, fails, moves radially outward, and strikes the containment portion of the case.

Such conventional methods and systems have generally been considered satisfactory for their intended purpose. However, there is still a need in the art for improved drainage systems for fan case assemblies.

SUMMARY OF THE INVENTION

A core for a fan containment case assembly includes a first core segment, a second core segment and an intermediate core segment. The intermediate core segment is disposed circumferentially between the first and second core segments. The core segments are configured to form at least a portion of an annular core for a fan containment case assembly. The intermediate core segment includes an axial inlet side, an axial outlet side, a radially inner side, a radially outer side, and a plenum. The radially outer side is configured to be operatively connected to a cylindrical outer case and the radially inner side is configured to be operatively connected to at least one arcuate panel to form a liner assembly. The plenum is defined between the axial inlet side and the axial outlet side through the intermediate core segment proximate the radially outer side, for fluid passage between the axial inlet side and the axial outlet side.

The plenum can extend beyond the axial outlet side of the intermediate core segment. The plenum can include a fluid inlet proximate the axial inlet side and a fluid outlet opposing the fluid inlet. The fluid inlet can have a greater cross-sectional flow area than the fluid outlet. It is contemplated that a portion of the plenum proximate the fluid inlet can be a funnel and a portion of the plenum aft of the funnel portion can be a conduit in fluid communication with the funnel portion. The intermediate core segment can also include an inner plenum wall defined between the radially outer side and the radially inner side of the intermediate core segment. The intermediate core segment can also include a plurality of ribs. At least a portion of one of the ribs can extend radially from the radially inner side of the intermediate core segment to the inner plenum wall, and/or the ribs can extend radially from the radially inner side of the intermediate core segment to the inner plenum wall of the funnel portion of the plenum, while only some of the ribs extend from the radially inner side to the inner plenum wall of the conduit portion of the plenum. It is also contemplated that the ribs can also extend from the radially inner side to the radially outer side of the intermediate core segment.

The intermediate core segment can also include an inner diameter segment wall on the radially inner side and an outer diameter segment wall on the radially outer side. The outer diameter segment wall can also be an outer diameter wall of the plenum. It is further contemplated that the intermediate core segment and the plenum can be made from a molded polymer, such as polyetherimide (PEI), polyimide, polyether ether ketone (PEEK), polycarbonate (PC), polyether ketone ketone (PEKK), polysulfone, Nylon, polyphenylsulfide, reinforced polyetherimide, reinforced polyimide, reinforced PEEK, reinforced PC, reinforced PEKK, reinforced polysulfone, reinforced Nylon, reinforced polyphenylsulfide, and combinations thereof. The intermediate core segment and the plenum can be co-molded by injection molding and/or compression molding.

A fan containment case assembly with a drainage system includes a cylindrical outer case with a forward end and an aft end and a liner assembly. The liner assembly is disposed inside the cylindrical outer case. Further, the liner assembly includes a plurality of arcuate panels arranged end to end to form a cylinder and an annular core. The annular core includes a first core segment, a second core segment, and an intermediate core segment, as described above. The core segments are disposed radially between at least one of the arcuate panels and the cylindrical outer case. The radially inner side of the intermediate core segment is engaged with at least one of the arcuate panels and the radially outer side of the intermediate core segment is engaged with the cylindrical outer case.

In accordance with certain embodiments, the drainage system can also include a plurality of splice joints. Each splice joint can separate each adjacent end of the arcuate panels. The intermediate core segment can be operatively connected to adjacent ends of respective arcuate panels proximate the respective splice joint. At least one additional intermediate core segment can be operatively connected to other adjacent ends of respective arcuate panels proximate to another respective splice joint. First and second core segments can be standard aluminum honey-comb core segments. Fan containment case can include more than first and second standard core segments. Each standard aluminum honeycomb core segment can be disposed radially between at least one arcuate panel and the cylindrical outer case and circumferentially between the intermediate core segment and the additional intermediate core segment.

The plenum can extend aft of the axial outlet side of the intermediate core segment into a rear core of a rear liner. The rear liner can be disposed inside the cylindrical outer case aft of the liner assembly. Rear core of the rear liner can include a groove for receiving the plenum of the intermediate core segment. The drainage system can also include an abradable strip liner disposed inside the cylindrical outer case forward of the liner assembly. The plenum can have a fluid inlet on the axial inlet side proximate the abradable strip liner and a fluid outlet aft of the axial outlet side within the rear core of the rear liner. The cylindrical outer case can include a first drainage hole proximate the forward end and a second drainage hole proximate the aft end. The plenum can provide a fluid passage between the forward end and the aft end for fluid drainage out of the first drainage hole and/or the second drainage hole. It is also contemplated that the inner diameter segment wall can be continuously bonded to at least one of the arcuate panels, and/or the outer diameter segment wall can be continuously bonded to the cylindrical outer case.

These and other features of the systems and methods of the subject disclosure will become more readily apparent to those skilled in the art from the following detailed description of the embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
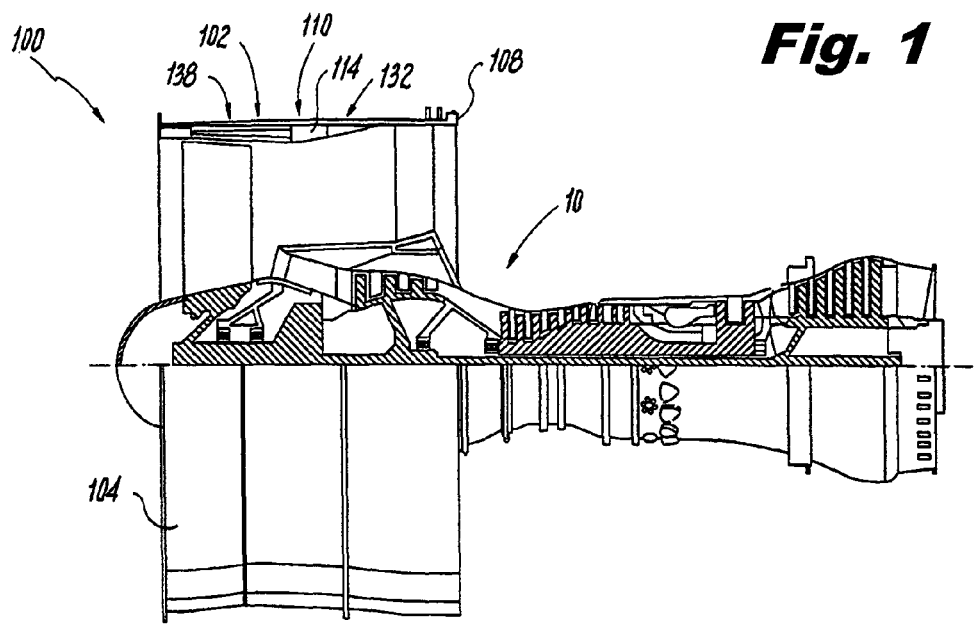
FIG. 1 is a is cut-away side view of an exemplary embodiment of a turbofan engine constructed in accordance with the present disclosure, showing the fan containment case assembly and the drainage system.

Reference will now be made to the drawings wherein like reference numerals identify similar structural features or aspects of the subject disclosure. For purposes of explanation and illustration, and not limitation, a cut-away side view of an exemplary embodiment of a drainage system for a fan containment case assembly in accordance with the disclosure is shown in FIG. 1 and is designated generally by reference character 100. Other embodiments of drainage systems for fan containment systems in accordance with the disclosure, or aspects thereof, are provided in FIGS. 2-6, as will be described.

As shown in FIG. 1, a drainage system 100 for a fan containment case assembly 102 of a gas turbine engine 10 includes a cylindrical outer case 104 with a forward end 106 and an aft end 108 and a liner assembly 110. Liner assembly 110 is disposed inside cylindrical outer case 104. Drainage system 100 also includes an abradable strip liner 138 and a rear liner 132. Abradable strip liner 138 is disposed inside cylindrical outer case 104 forward of liner assembly 110. Rear liner 132 is disposed inside cylindrical outer case 104 aft of liner assembly 110.

Figure 2:
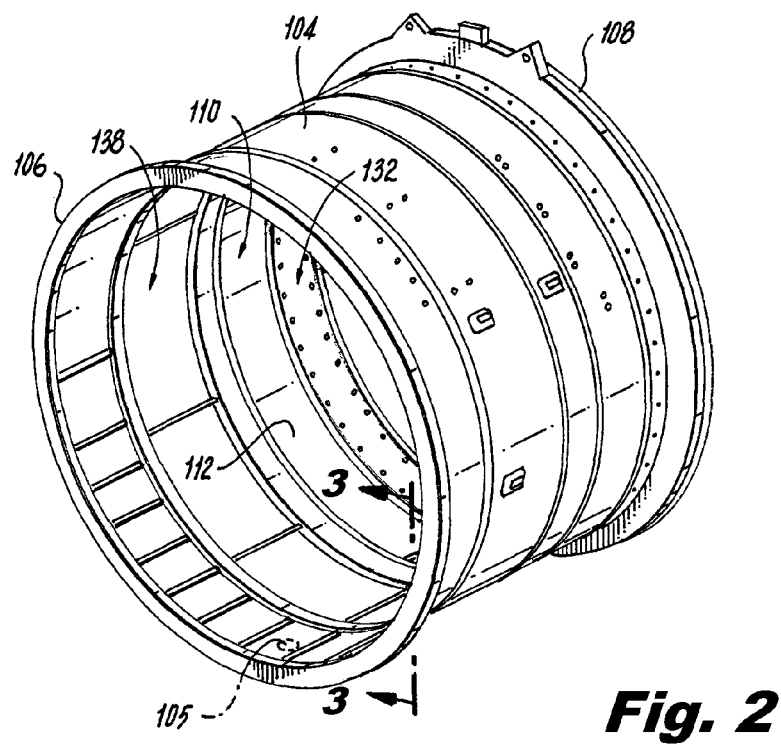
FIG. 2 is a perspective view of the fan containment case assembly of the turbofan engine as shown in FIG. 1, showing the arcuate panels that line the radially inner side of the intermediate core segment.

With reference now to FIGS. 1-2, liner assembly 110 includes a plurality of arcuate panels 112 and an annular core 114. Arcuate panels 112 are arranged end to end circumferentially to form a cylinder. Annular core 114 is disposed radially between arcuate panels 112 and cylindrical outer case 104. Cylindrical outer case 104 includes a first drainage hole 105 proximate forward end 106, and a second drainage hole 107 proximate aft end 108, shown in FIG. 3.

Figure 3:
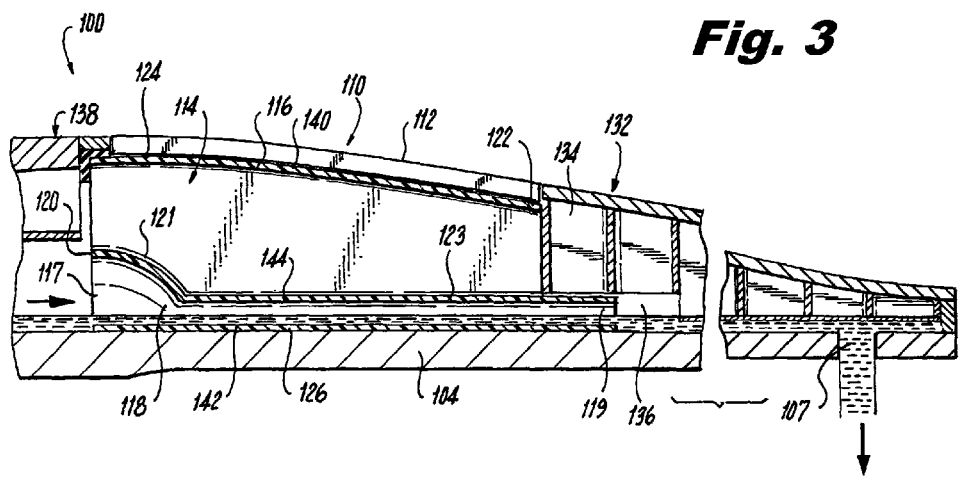
FIG. 3 is a partial cross-sectional side-elevation view of the fan containment case assembly of FIG. 2, showing a plenum through the intermediate core segment.

As shown in FIG. 3, core 114 includes an intermediate core segment 116. Intermediate core segment 116 includes a plenum 118. Plenum 118 is defined through intermediate core segment 116 for fluid passage there through. Intermediate core segment 116 has an axial inlet side 120, an axial outlet side 122 opposed to axial inlet side 120, a radially inner side 124, and a radially outer side 126 opposed to radially inner side 124. Radially outer side 126 is operatively connected to cylindrical outer case 104. Radially inner side 124 is operatively connected to at least one arcuate panel 112 to form liner assembly 110. Plenum 118 extends through the intermediate core segment 116 proximate radially outer side 126 for fluid passage between axial inlet side 120 and axial outlet side 122.

With continued reference to FIG. 3, plenum 118 includes an inner plenum wall 144 defined between radially outer side 126 and radially inner side 124. Plenum 118 includes a fluid inlet 117 proximate axial inlet side 120 and a fluid outlet 119 opposing fluid inlet 117. Fluid inlet 117 has a greater cross-sectional flow area than fluid outlet 119. Those skilled in the art will readily appreciate that the circumferential length of fluid inlet 117 can allow for fluid to enter plenum 118 even if gas turbine engine 10 is mounted to an aircraft at slight angle relative to the ground, for example the dihedral angle of aircraft wings. A portion 121 of plenum 118 proximate fluid inlet 117 is a funnel, e.g. funnel portion 121, and a portion 123 of plenum 118 aft of funnel portion 121 is a conduit, e.g. conduit portion 123, in fluid communication with funnel portion 121. Plenum 118 extends aft of axial outlet side 122 of intermediate core segment 116 into a rear core 134 of rear liner 132. Rear core 134 of rear liner 132 includes a groove 136 for receiving conduit portion 123 of plenum 118. Fluid inlet 117 is proximate to abradable strip liner 138 and fluid outlet 119 is within rear core 134 of rear liner 132. Plenum 118 is configured to provide a fluid passage between forward end 106 and aft end 108, as shown in FIG. 2, for fluid drainage out of first and/or second drainage holes, 105 and 107, respectively.

Figure 4:
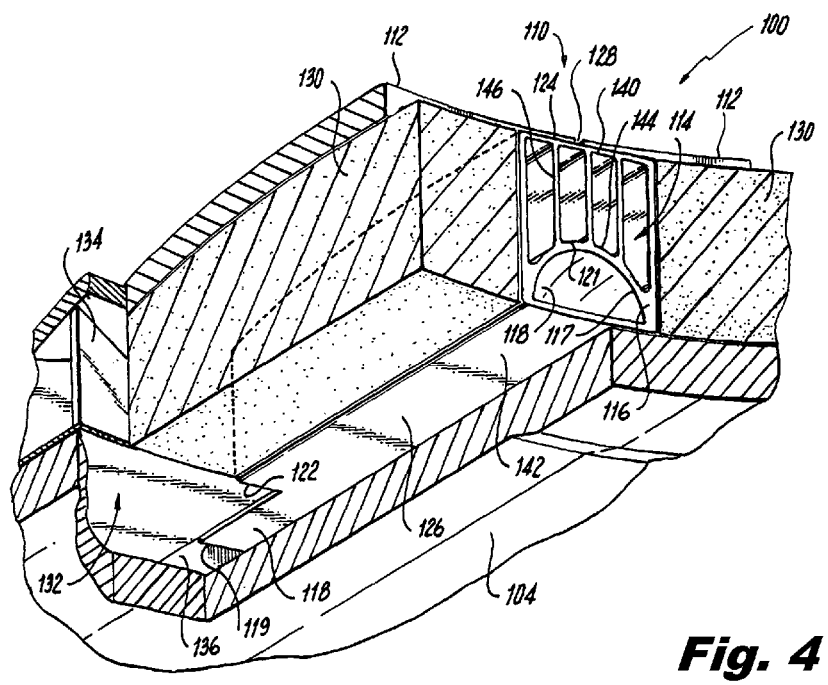
FIG. 4 is a partial cut-away perspective view of the fan containment case assembly of FIG. 2, viewed from the forward end side of the cylindrical outer case, showing the intermediate core segment with ribs extending from the inner plenum wall to the inner diameter segment wall.

Now with reference to FIG. 4, intermediate core segment 116 includes an inner diameter segment wall 140 on radially inner side 124 and an outer diameter segment wall 142 on radially outer side 126. Outer diameter segment wall 142 is also the outer diameter wall of plenum 118. Inner diameter segment wall 140 is continuously bonded to at least a portion of one of arcuate panels 112. Outer diameter segment wall 142 is continuously bonded to cylindrical outer case 104. Drainage system 100 includes a splice joint 128. Intermediate core segment 116 is operatively connected to adjacent ends of respective arcuate panels 112 proximate their respective splice joint 128. It is contemplated that respective splice joints 128 can separate each adjacent end of arcuate panels 112. At least one other of the respective splice joints 128 can be supported by a respective additional intermediate core segment 116.

With continued reference to FIG. 4, annular core 114 also includes a first core segment and a second core segment, e.g. standard core segments 130. It is contemplated that standard core segments 130 can optionally be disposed radially between at least one arcuate panel 112 and cylindrical outer case 104 and circumferentially between two intermediate core segments 116. While fan containment case assembly is described herein with one or more intermediate core segments 116, and standard core segments 130, those skilled in the art will readily appreciate that various numbers of intermediate core segments 116 and standard core segments can be used in the fan containment case assembly. Further, those skilled in the art will readily appreciate that intermediate core segments 116 are not limited to being used only at splice joints, and that intermediate core segments 116 can be used in a variety of suitable locations throughout the fan containment case assembly. Further, it is contemplated that standard core segments 130 can be used for some splice joints 128, where intermediate core segments 116 are used in the remaining splice joints 128

Figure 5:
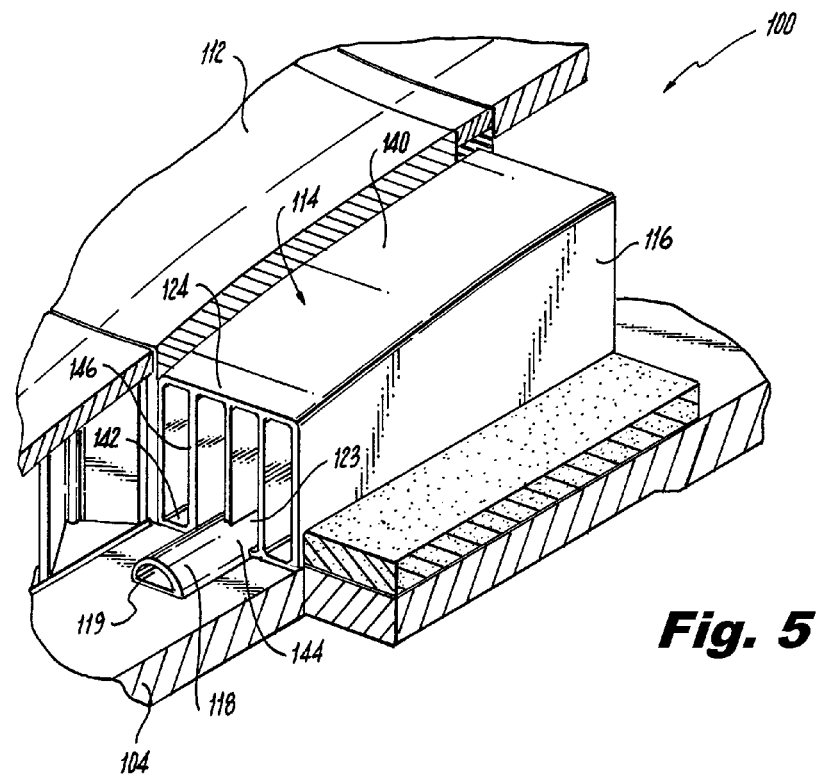
FIG. 5 is a partial cut-away perspective view of the fan containment case assembly shown in FIG. 2, from the aft end side of the cylindrical outer case, showing the intermediate core segment with parallel ribs extending from both the inner plenum wall and the outer diameter segment wall to an inner diameter segment wall.

As shown in FIG. 5, intermediate core segment 116 includes a plurality of radially oriented ribs 146. Ribs 146 extend radially from radially inner side 124 and inner diameter segment wall 140 to inner plenum wall 144. Those skilled in the art will readily appreciate that because a funnel portion 121, as shown in FIG. 4, is wider than conduit portion 123, only some of ribs 146 extend from radially inner side 124 to inner plenum wall 144 of conduit portion 123, while all of ribs 146 extend radially from radially inner side 124 to inner plenum wall 144 of funnel portion 121, as shown in FIG. 4. Those skilled in the art will readily appreciate that ribs 146, or portions thereof, not extending to inner plenum wall 144, extend from inner diameter segment wall 140 to outer diameter segment wall 142.

Figure 6:
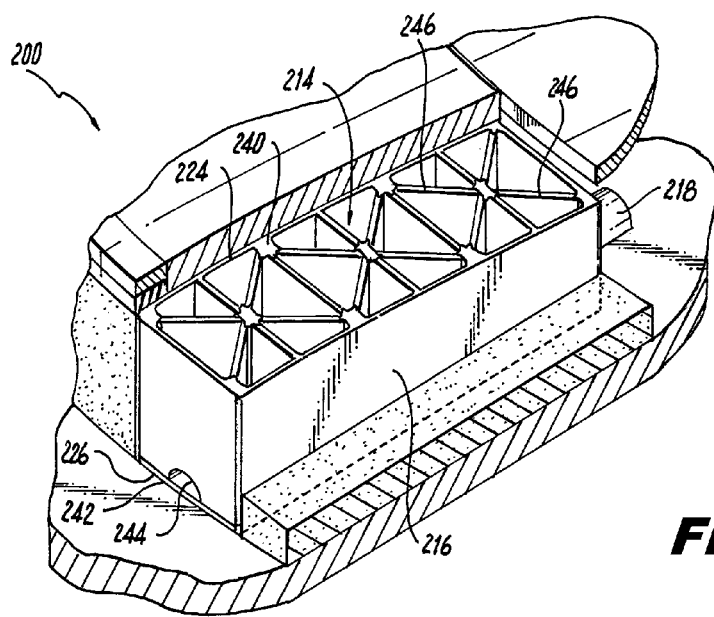
FIG. 6 is a partial cut-away perspective view of another exemplary embodiment of a fan containment case constructed in accordance with the present disclosure, showing the intermediate core segment with parallel ribs and ribs at opposing angles extending from both the inner plenum wall and the outer diameter segment wall to an inner diameter segment wall.

As shown in FIG. 6, intermediate core segment 216, similar to intermediate core segment 116, includes a plurality of radially oriented ribs 246 and an inner plenum wall 244. At least a portion of one of the ribs 246 extends radially from a radially inner side 224 of intermediate core segment 216 to inner plenum wall 244. The remaining portions of ribs 246 extend from radially inner side 224 to radially outer side 226. While plenum 218 is shown as having a consistent cross-sectional flow area, those skilled in the art will readily appreciate that plenum 218 can have similar funnel and conduit portions like plenum 118. Ribs 246 are both radially aligned with to one another and are aligned at opposing angles to one another. Those skilled in the art will readily appreciate that ribs 146 can have a simpler mold tool, tending to make ribs 146 easier to manufacture than ribs 246, while ribs 246 tend to allow for intermediate core segment 216 to be more dimensionally stable after molding, increasing ease of assembly.

Those skilled in the art will readily appreciate that intermediate core segments 116 and 216 can be made from a molded polymer, such as polyetherimide (PEI), polyimide, polyether ether ketone (PEEK), polycarbonate (PC), polyether ketone ketone (PEKK), polysulfone, Nylon, polyphenylsulfide, reinforced polyetherimide, reinforced polyimide, reinforced PEEK, reinforced PC, reinforced PEKK, reinforced polysulfone, reinforced Nylon, reinforced polyphenylsulfide, and combinations thereof. Further, it is contemplated that intermediate core segments 116 and 216, and their respective plenums 118 and 218 can be co-molded by injection molding and/or compression molding. Those skilled in the art will readily appreciate that compression molding can include using thermoset or thermoplastic resin with long fiber carbon or fiberglass in the form of continuous fiber or chopped tape, e.g. HexMC®, available from Hexcel Corporation, Dublin, Calif. 94568.

Using molded polymers, such as those described above, to mold intermediate core segments 116 and 216, and their respective plenums 118 and 218, tends to reduce costs and simplifies manufacturing as compared with traditional dense aluminum honeycomb core segments. In addition, the molded plenums 118 and 218 prevent galvanic action typically found between traditional aluminum honeycomb core segments and titanium or composite fan cases. In one aspect, manufacturing can potentially be simplified because the co-molded plenums 118 and 218 can eliminate the anodize and bond priming processes found in traditional dense core segment drainage systems. Those skilled in the art will readily appreciate that this can be a more environmentally friendly method than anodizing and bonding a tube to a traditional dense core segment.

The systems, devices and methods of the present disclosure, as described above and shown in the drawings, provide for fan containment case assemblies with superior properties including improved drainage systems, reduced overall weight and simplification of assembly. While the apparatus and methods of the subject disclosure have been shown and described with reference to preferred embodiments, those skilled in the art will readily appreciate that changes and/or modifications may be made thereto without departing from the spirit and scope of the subject disclosure.

What is claimed is:

1. A core for a fan containment case assembly, comprising:
    a first core segment;
    a second core segment; and
    an intermediate core segment disposed circumferentially between the first and second core segments, wherein the core segments are configured to form at least a portion of an annular core for a fan containment case assembly, and wherein the intermediate core segment includes an axial inlet side, an axial outlet side, a radially inner side, a radially outer side, wherein the radially outer side is configured to be operatively connected to a cylindrical outer case and the radially inner side is configured to be operatively connected to at least one arcuate panel to form a liner assembly, and a plenum for fluid passage defined between the axial inlet side and the axial outlet side through the intermediate core segment proximate the radially outer side, wherein the plenum includes a fluid inlet proximate the axial inlet side and a fluid outlet opposing the fluid inlet, wherein the fluid inlet has a greater cross-sectional flow area than the fluid outlet.

2. A core as recited in claim 1, wherein the plenum extends beyond the axial outlet side of the intermediate core segment.

3. A core as recited in claim 1, wherein a portion of the plenum proximate the fluid inlet is a funnel and a portion of the plenum proximate the fluid outlet is a conduit in fluid communication with the funnel portion.

4. A core as recited in claim 3, wherein the intermediate core segment includes a plurality of ribs and the plenum includes an inner plenum wall defined between the radially outer side of the intermediate core segment and the radially inner side of the intermediate core segment, wherein the ribs extend radially from the radially inner side of the intermediate core segment to the inner plenum wall of the funnel portion of the plenum and only some of the ribs extend from the radially inner side of the intermediate core segment to the inner plenum wall of the conduit portion of the plenum.

5. A core as recited in claim 1, wherein the plenum includes an inner plenum wall defined between the radially outer side of the intermediate core segment and the radially inner side of the intermediate core segment.

6. A core as recited in claim 5, wherein intermediate core segment includes a plurality of ribs, wherein at least a portion of one of the ribs extends radially from the radially inner side of the intermediate core segment to the inner plenum wall.

7. A core as recited in claim 1, wherein the intermediate core segment includes an inner diameter segment wall on the radially inner side of the intermediate core segment and an outer diameter segment wall on the radially outer side of the intermediate core segment, wherein the outer diameter segment wall forms an outer diameter wall of the plenum, and wherein the plenum includes an inner plenum wall defined between the outer diameter wall of the plenum and the inner diameter segment wall.

8. A core as recited in claim 1, wherein the intermediate core segment and the plenum include a molded polymer selected from the group consisting of polyetherimide (PEI), polyimide, polyether ether ketone (PEEK), polycarbonate (PC), polyether ketone ketone (PEKK), polysulfone, Nylon, polyphenylsulfide, reinforced polyetherimide, reinforced polyimide, reinforced PEEK, reinforced PC, reinforced PEKK, reinforced polysulfone, reinforced Nylon, reinforced polyphenylsulfide, and combinations thereof.

9. A core as recited in claim 1, wherein the intermediate core segment and the plenum are co-molded by injection molding.

10. A core as recited in claim 1, wherein the intermediate core segment and the plenum are co-molded by compression molding.

11. A fan containment case with a drainage system, the fan containment case comprising:
a cylindrical outer case with a forward end and an aft end; and
a liner assembly disposed inside the cylindrical outer case, the liner assembly including a plurality of arcuate panels arranged end to end to form a cylinder and an annular core, the annular core including:
a first core segment;
a second core segment; and
an intermediate core segment disposed circumferentially between the first and second core segments, wherein the intermediate core segment includes an axial inlet side, an axial outlet side, a radially inner side, a radially outer side, and a plenum for fluid passage defined between the axial inlet side and the axial outlet side through the intermediate core segment proximate the radially outer side, wherein the core segments are disposed radially between at least one of the arcuate panels and the cylindrical outer case, wherein the radially inner side of the intermediate core segment is engaged with at least one of the arcuate panels and the radially outer side of the intermediate core segment is engaged with the cylindrical outer case, wherein at least one of the first and second core segments is disposed radially between at least one arcuate panel and the cylindrical outer case and circumferentially between the intermediate core segment and the additional intermediate core segment.

12. The fan containment case as recited in claim 11, wherein a splice joint separates each adjacent end of the arcuate panels, wherein the intermediate core segment is operatively connected to adjacent ends of respective arcuate panels proximate the respective splice joint, and wherein at least one additional intermediate core segment is operatively connected to other adjacent ends of respective arcuate panels proximate to another respective splice joint.

13. The fan containment case as recited in claim 11, wherein the plenum extends aft of the axial outlet side of the intermediate core segment into a rear core of a rear liner, wherein the rear liner is disposed inside the cylindrical outer case aft of the liner assembly.

14. The fan containment case as recited in claim 13, wherein the rear core of the rear liner includes a groove for receiving the plenum of the intermediate core segment.

15. The fan containment case as recited in claim 11, further comprising an abradable strip liner disposed inside the cylindrical outer case forward of the liner assembly, and a rear liner disposed inside the cylindrical outer case aft of the liner assembly, wherein the plenum has a fluid inlet on the axial inlet side proximate the abradable strip liner and a fluid outlet aft of the axial outlet side within a rear core of the rear liner.

16. The fan containment case as recited in claim 11, wherein the cylindrical outer case includes a first drainage hole proximate the forward end, and a second drainage hole proximate the aft end, wherein the plenum provides a fluid passage between the forward end and the aft end for fluid drainage out of at least one of the first drainage hole and the second drainage hole.

17. The fan containment case as recited in claim 11, wherein the intermediate core segment includes an inner diameter segment wall on the radially inner side of the intermediate core segment and an outer diameter segment wall on the radially outer side of the intermediate core segment, wherein the outer diameter segment wall forms an outer diameter wall of the plenum, wherein the inner diameter segment wall is continuously bonded to at least one of the arcuate panels and the outer diameter segment wall is continuously bonded to the cylindrical outer case.

* * * * *